May 7, 1929.  W. C. MILES  1,712,089
ELEVATOR DOOR ACTUATING MECHANISM
Original Filed March 28, 1923  7 Sheets-Sheet 1

INVENTOR
William C. Miles
BY
Williams & Morse
ATTORNEYS.

May 7, 1929. W. C. MILES 1,712,089
ELEVATOR DOOR ACTUATING MECHANISM
Original Filed March 28, 1923 7 Sheets-Sheet 2
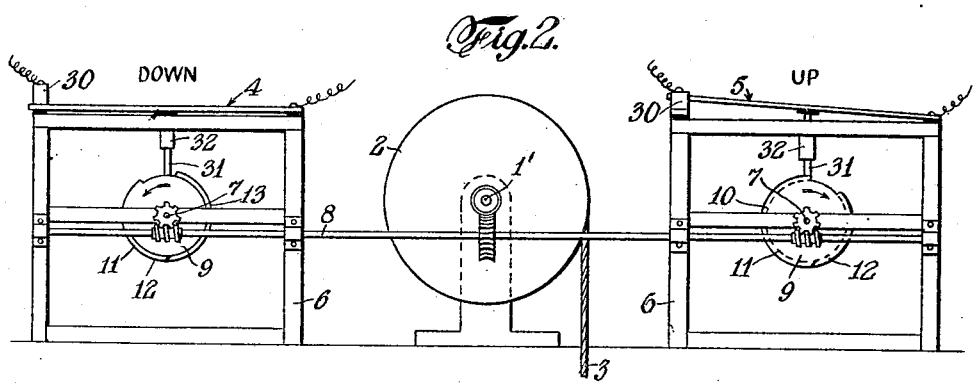
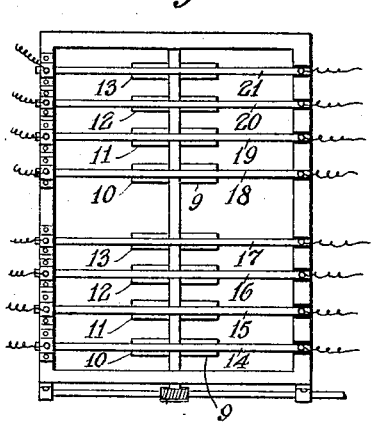
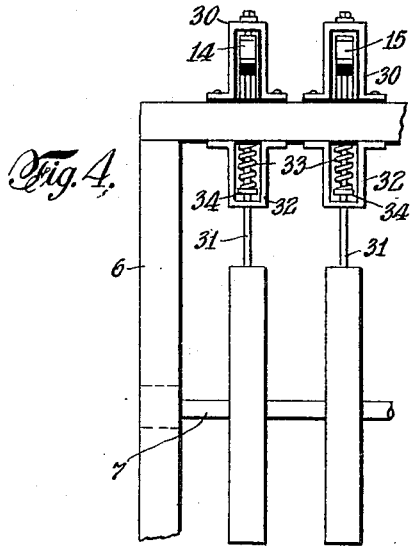
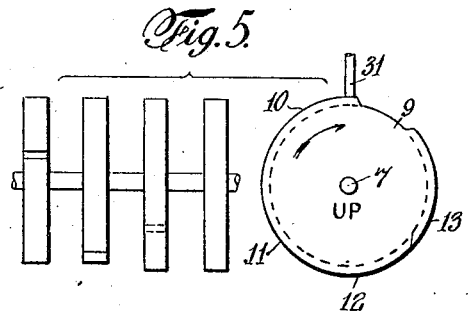
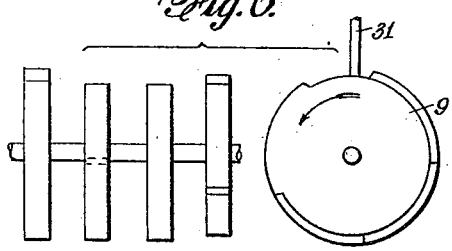
INVENTOR
William C. Miles
BY
Williams & Morse
ATTORNEYS.

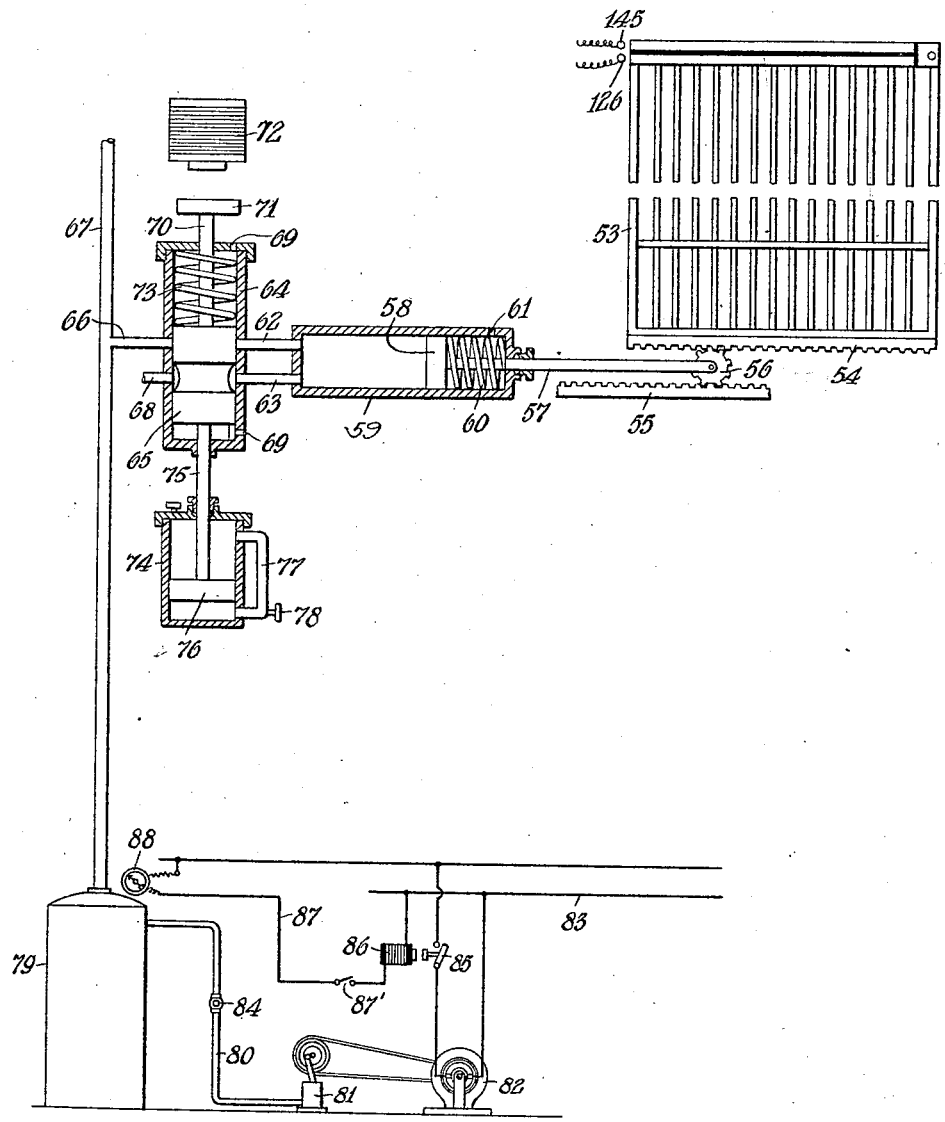

May 7, 1929.  W. C. MILES  1,712,089

ELEVATOR DOOR ACTUATING MECHANISM

Original Filed March 28, 1923   7 Sheets-Sheet 4

William C. Miles
INVENTOR
BY Williams & Morse
ATTORNEYS.

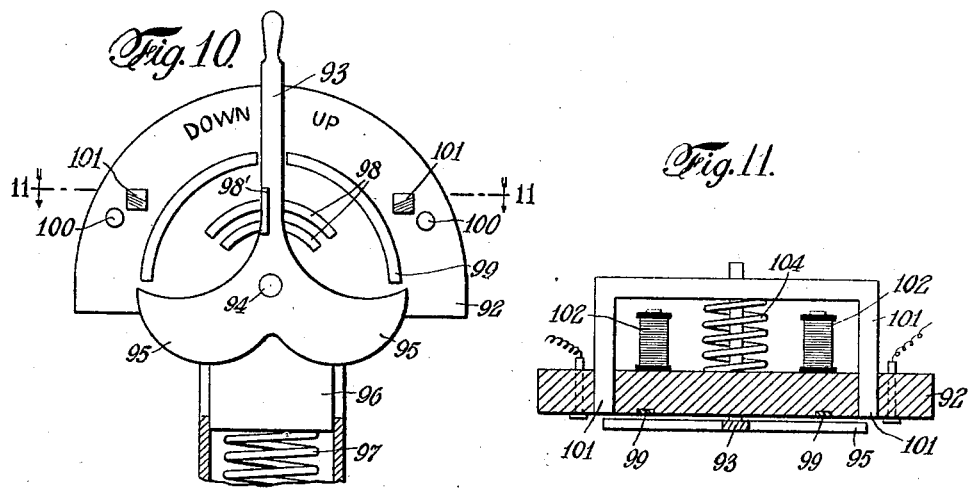
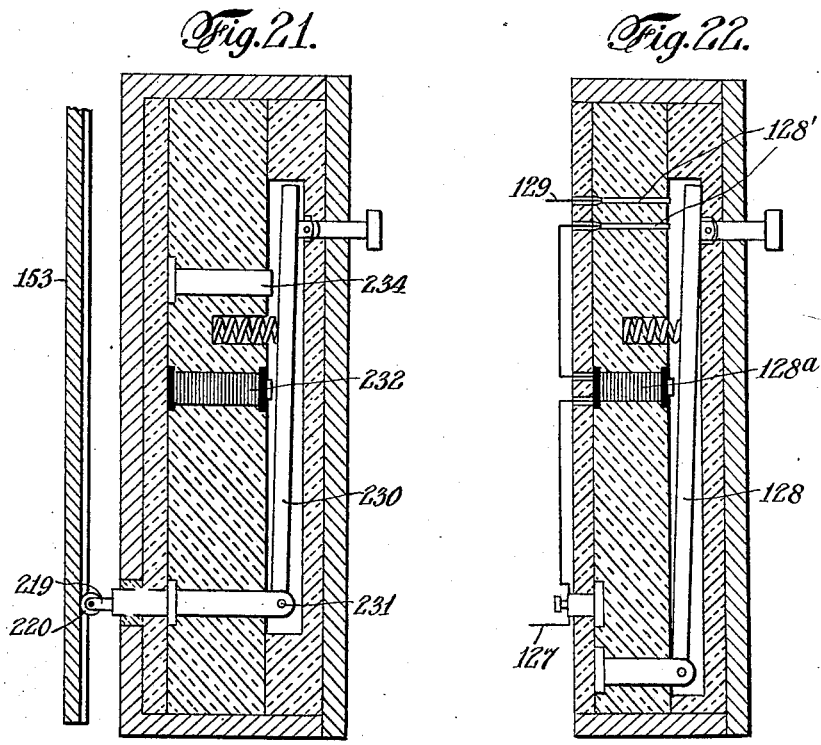

May 7, 1929.  W. C. MILES  1,712,089
ELEVATOR DOOR ACTUATING MECHANISM
Original Filed March 28, 1923   7 Sheets-Sheet 6
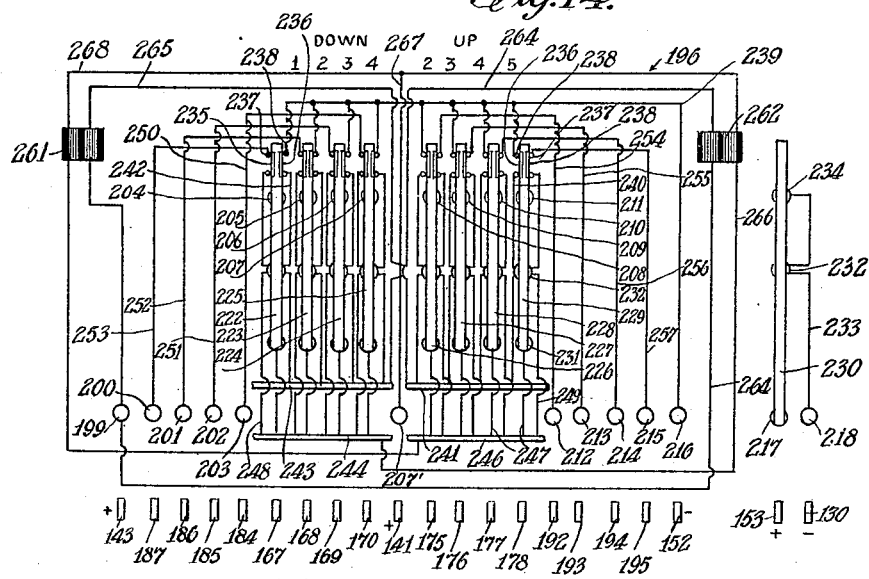

May 7, 1929.  W. C. MILES  1,712,089
ELEVATOR DOOR ACTUATING MECHANISM
Original Filed March 28, 1923  7 Sheets-Sheet 7
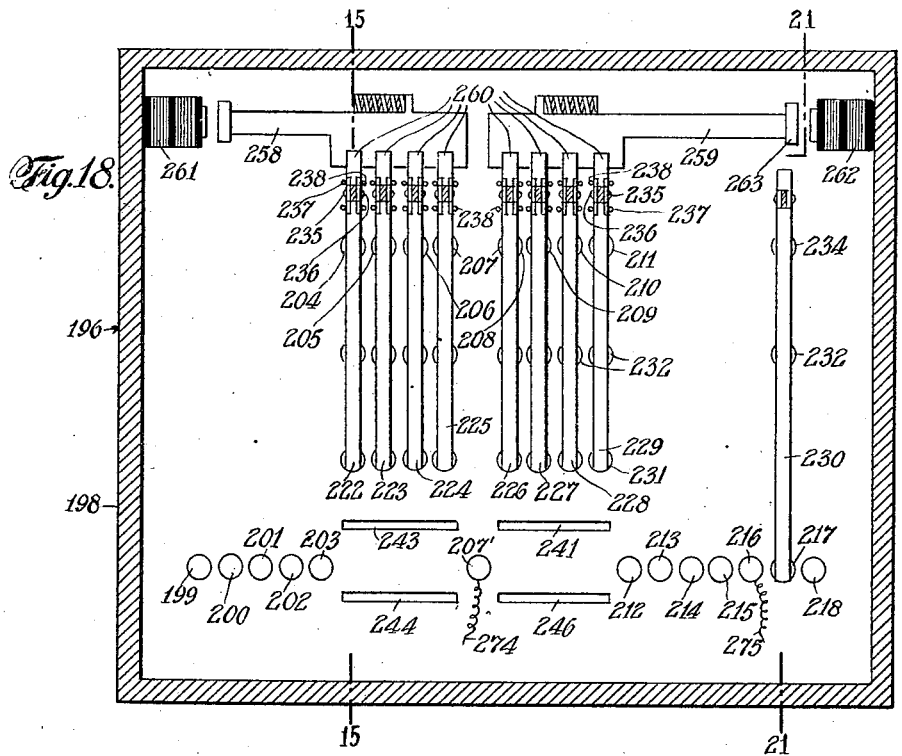
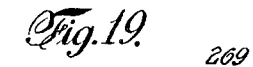
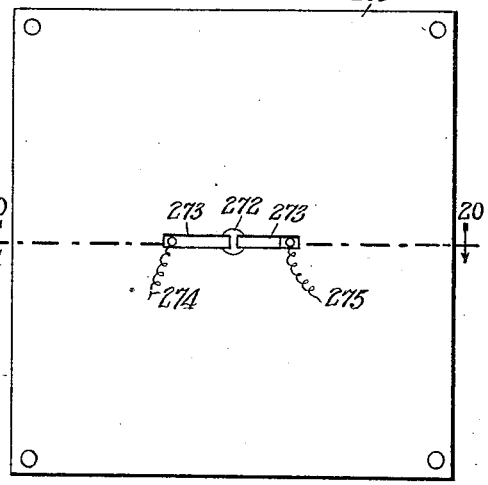
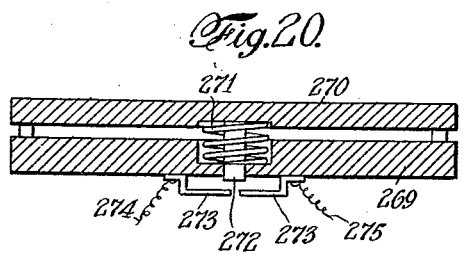
INVENTOR
William C. Miles
BY
Williams & Morse
ATTORNEYS.

Patented May 7, 1929.

1,712,089

UNITED STATES PATENT OFFICE.

WILLIAM C. MILES, OF BROOKLYN, NEW YORK, ASSIGNOR TO ELEVATOR SUPPLIES COMPANY, INC., OF HOBOKEN, NEW JERSEY, A CORPORATION OF NEW JERSEY.

ELEVATOR-DOOR-ACTUATING MECHANISM.

Original application filed March 28, 1923, Serial No. 628,253. Divided and this application filed May 5, 1928. Serial No. 275,300.

This invention relates to elevator gate or door actuating mechanism, and is herein shown and described in connection with an automatic elevator control system of the type disclosed and claimed in my co-pending application, automatic elevator and gate control system, Serial No. 628,253, filed March 28, 1923, of which the present application is a division.

Although the present invention is shown in connection with a particular type of elevator control system, it is to be understood that it may, of course, be employed in connection with other forms of elevator control systems of the push-button type and in connection with various forms of other types of elevator control systems.

The general object of the invention is to provide an improved mechanism of the character mentioned which is reliable in operation, simple in construction, and is adapted to so operate as to insure against accidentally opening and closing of the gate or door with which it is used.

The invention will be understood from the following description taken in connection with the accompanying drawings in which—

Figure 1:
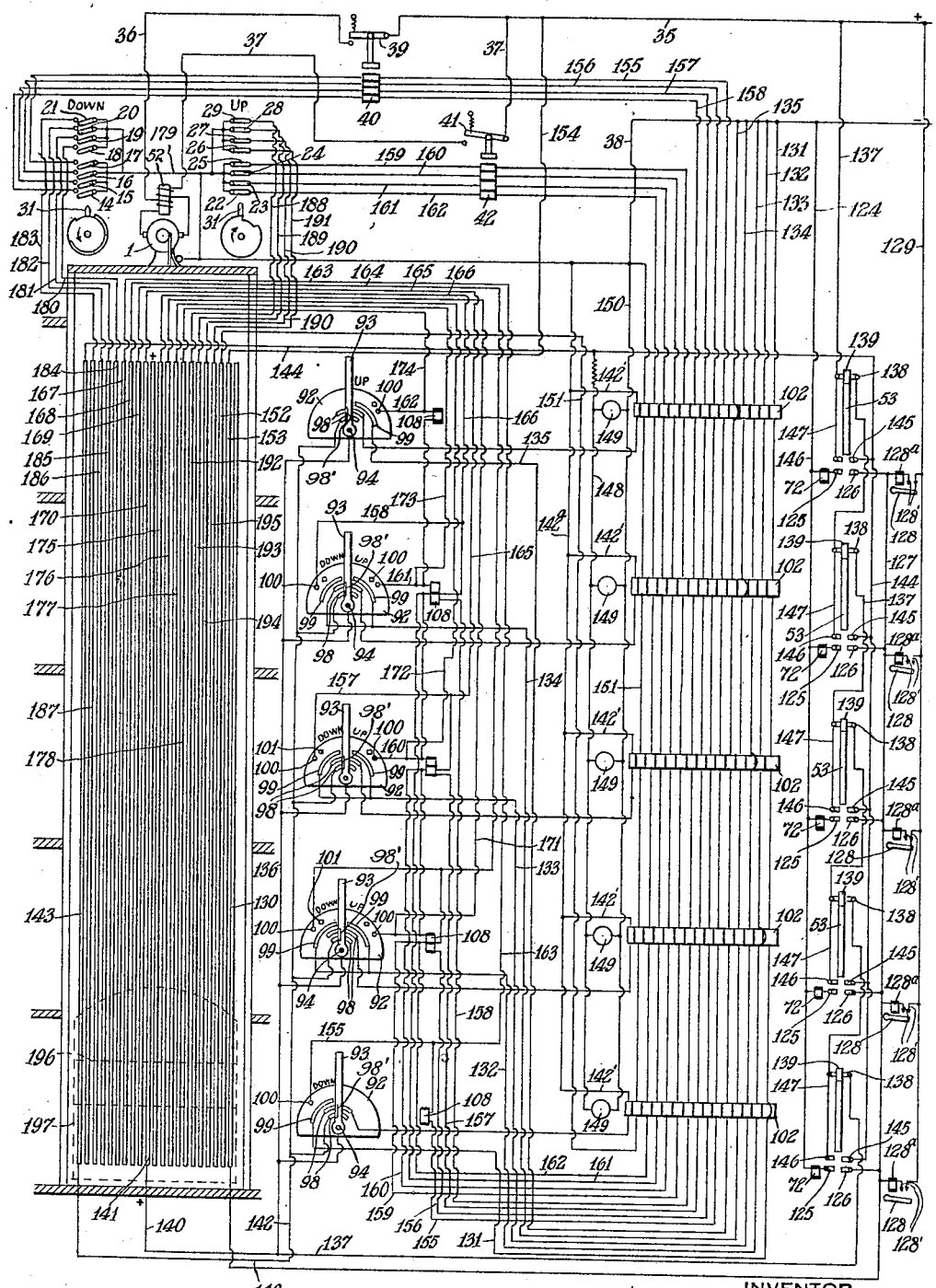
Figure 8:
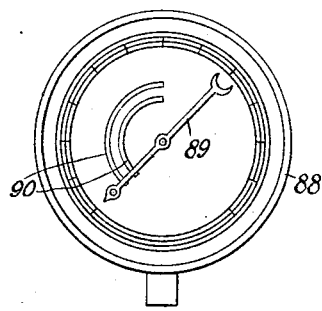
Figure 9:
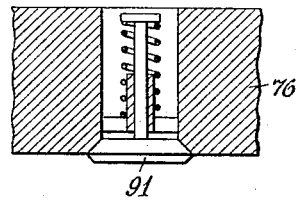
Figure 12:
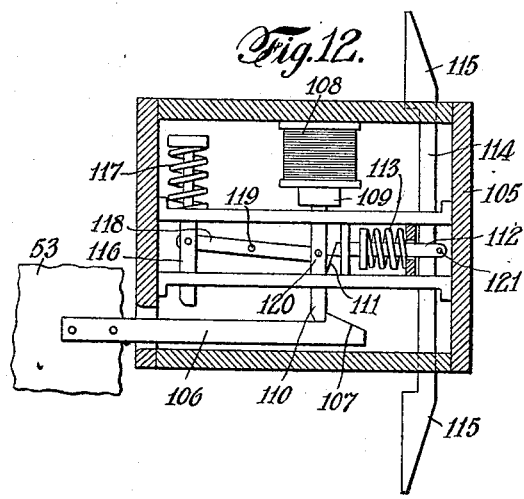
Figure 13:
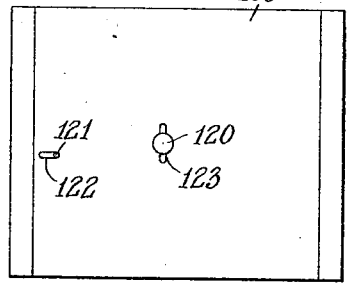

Figure 1 is a diagrammatic view of an automatic elevator control system; Figure 2 is an elevation of the switch mechanism operated in consonance with the elevator car for opening and closing the up and down circuits and the gate controlling circuits; Figure 3 is a plan view of one section of said mechanism; Figure 4 is an enlarged detail view of a part of the switch mechanism; Figure 5 includes views taken at right angles to one another illustrating the set of cams controlling the up switches; Figure 6 includes views similar to Figure 5 illustrating the set of cams for controlling the down switches; Figure 7 is a view, partly in diagram and partly in section, illustrating the gate operating mechanism, showing the equipment of one gate only, the others being duplicates thereof; Figure 8 is a face view on an enlarged scale of a pressure indicator for the pressure tank; Figure 9 is an enlarged sectional detail of the piston of the dash pot to show the valve thereof; Figure 10 is a front view of one of the floor switches, portions being broken away; Figure 11 is a section on the line 11—11 of Figure 10; Figure 12 is an elevation of the working parts of one of the gate locks showing the casing in section; Figure 13 is an elevation of the gate lock looking from the inside of the elevator shaft; Figure 14 is a diagrammatic view of the switch board carried by the car; Figure 15 is a vertical section of said switch board taken on the line 15—15 of Figure 18; Figure 16 is a sectional detail illustrating one of the movable contacts or collectors of said switch board; Figure 17 is a detail view of one of the switches of said switch board, Figure 18 is an elevation of the switch board, portions being shown in section, illustrating the means for locking either the down or up switches when one or more of the switches of the other set are operated; Figure 19 is a bottom plan view of the switch carried by the floor of the car; Figure 20 is a section on the line 20—20 of Figure 19; Figure 21 is a vertical section taken on the line 21—21 of Figure 18; and Figure 22 is a sectional view similar to Figure 21 of one of the floor gate closing switches.

In the drawings, the numeral 1 designates a reversible motor which in being actuated in opposite directions by the reversal of current, moves the car upwardly and downwardly as usual, a drum 2 being operated by the motor upon which a cable 3 connected to the car is wound and unwound.

Operated in consonance with the car and motor is a switch mechanism embodying the down section 4 and the up section 5 which are of similar construction, each embodying a suitable frame 6 and a shaft 7 journaled within said frame. The shafts 7 are operatively connected with a common shaft 8 that is connected with the armature shaft 1' of the motor 1, suitable reduction gearing being provided whereby each shaft 7 is rotated less than a full revolution for the full vertical movement of the car. Each shaft 7 carries two sets of disks 9, there being four disks in each set when the system is used with a five floor elevator, as illustrated, although it will be understood that the number of circuits will depend upon the number of floors. The disks 9 of each set are provided with arcuate cams 10, 11, 12 and 13 projecting from their peripheries. Said cams have their starting ends disposed in a common longitudinal line, the cam 11 being longer than the cam 10, the cam 12 longer than the cam 11, and the cam 13 longer than the cam 12, as apparent by reference to Figs. 2, 5 and 6. The down switch mechanism 4 includes the switches 14, 15, 16, 17, 18, 19, 20 and 21 carried by the respective frame 6, and the up switch mechanism 5 includes the switches 22, 23, 24, 25, 26, 27, 28 and 29, said switches being disposed above the respective disks 9. The frames 6 carry upstanding yokes 30 in which the free ends of the switches work, said switches opening the respective circuits when they are moved downwardly by their spring tension, and closing the circuits when they are raised. Depending yokes 32 are carried by the frames 6 through which vertical pins 31 are slidable, the upper ends of said pins engaging the switches and their lower ends seating upon the peripheries of the disks 9 which are provided with the cams. Coiled wire expansion springs 33 are confined between the frames 6 and collars 34 upon the pins 31 within the yokes 32, whereby to depress said pins. When the pins 31 are raised by the cams, the switches are moved upwardly to closed position, and when the pins 31 are released by the cam so that they move downwardly, the switches spring downwardly to open position.

Figure 2 illustrates the position of the switches and cam disks when the car is at the first floor or lowermost landing. Thus, the pins 31 of the mechanism 4 are all lowered, the cams 10, 11, 12 and 13 being removed therefrom, and the pins 31 of the mechanism 5 are all raised by the forward ends of the cams. Therefore, when the car is at the first floor, the switches 14 to 21, inclusive, of the mechanism 4 are all in open position, while the switches of the mechanism 5 are all in closed position, whereby the respective circuits are open and closed. The switches 14, 15, 16 and 17 of one set of the mechanism 4 are operated the same as the switches 18, 19, 20 and 21 of the other set, which is also true of the two sets of switches of the mechanism 5. When the car leaves the first floor in its upward course, the switches 17 and 21 are closed, and the switches 25 and 29 are opened when the car reaches the second floor, the disks 9 rotating in the direction of the arrows in Figs. 2, 5 and 6 when the car moves upwardly, and moving in the opposite direction when the car is lowered. The switches 16 and 20 are closed when the car leaves the second floor in its upward movement, while the switches 24 and 28 are opened when the car reaches the third floor. The switches 15 and 19 are closed when the car moves upwardly from the third floor, the switches 23 and 27 are opened when the car reaches the fourth floor, the switches 14 and 18 are closed when the car moves upwardly from the fourth floor, and the switches 22 and 26 are opened when the car reaches the fifth floor. The switches 14 to 21 of the mechanism 4 are for controlling the stopping of the car and the opening of the gates during the downward course of the car, and when the car is at the fifth floor, all of the switches 14 to 21, inclusive, are closed. As the car reaches the fourth, third, second and first floors, the pairs of switches 14—18, 15—19, 16—20 and 17—21 are opened in succession. The switches 22 to 29, inclusive, of the mechanism 5 control the stopping of the car and the opening of the gates during the upward course of the car, said switches all being closed when the car is at the first floor, and the pairs of switches 25—29, 24—28, 23—27 and 22—26 are opened in succession, as the car reaches the second, third, fourth and fifth floors, respectively. It is evident that the down switches 14 to 21, inclusive, are opened as the car reaches the respective floors, while the up switches 22 to 29, inclusive, are opened at the upper floors during the upward movement of the car.

Positive and negative feed conductors 35 and 38 are provided for supplying the electrical energy for the system, a pair of branch conductors 36 and 37 being connected with the conductor 35 and to the motor 1 to which the conductor 38 is also connected, whereby when current flows from the conductor 36 through the motor to the conductor 38, the motor will operate in one direction, whereas if the current flows from the conductor 37 through the motor to the conductor 38, the motor will be rotated in the opposite direction. Thus, the conductors 36 and 37 can be connected to the armature brushes or field coils of the motor in such a manner that the current will flow through the armature coils or field coils in opposite directions for reversing the motor as will be readily understood. An armature switch 39 is disposed in the branch conductor 36 and is controlled by an electromagnet 40, and a similar armature switch 41 is disposed in the conductor 37 and is controlled by an electric magnet 42, the switches 39 and 41 being spring tensioned to open when the electromagnets are deenergized.

A usual sliding gate 53 is provided for the elevator shaft at each floor, and its actuating mechanism includes a rack 54 carried by the gate parallel with a stationary rack 55, a pinion on being disposed between and meshing with both racks, and being carried by a piston rod 57 extending from a piston 58 working within a cylinder 59. With this arrangement, the movement of the piston rod 57 is reduced, since the gate 53 will move twice the distance that the rod 57 moves, thereby providing a simple expedient to reduce the amount of movement of the piston 58. An expansion spring 60 is disposed between one end of the cylinder 59 and the piston 58 tending to open the gate, and which will open the gate when it is unlocked, the cylinder 59 having a vent 61 adjacent to said end for the egress and ingress of air as the piston is reciprocated. Attached to the other end of the cylinder 59 is a pair of pipes 62 and 63 for the inlet and outlet of compressed air or other pressure fluid, the gates being automatically closed by pressure fluid or other motive power.

The apparatus for supplying the pressure fluid and for controlling the flow of pressure fluid into and out of the cylinder 59 of each gate, includes a valve casing 64 in which a spool valve 65 is mounted for reciprocation, across the ends of the pipes 62 and 63, whereby the annular recess of the valve registers alternately with said pipes. Pipes 66 and 68 are connected to the casing 64 opposite to and in alinement with the respective pipes 62 and 63, the pipe 66 being a branch of a pressure fluid supply pipe 67 which supplies pressure fluid to the gate operating devices at the various floors. When the valve 65 is raised, it establishes communication between the pipes 66 and 62, whereby pressure fluid flows from the pipe 67 into the cylinder 59, and when the valve 65 is lowered, it shuts off communication between the pipes 66 and 62 and opens comunication between the pipes 63 and 68 whereby the pressure fluid can flow from the cylinder to the atmosphere into which the pipe 68 opens. The valve casing 64 has vent apertures 69 at its ends to allow the valve to move without interference, and the valve 65 has a stem 70 projecting upwardly out of the casing 64 and carrying an armature 71 controlled by an electromagnet 72, said magnet when energized raising the valve, and the valve being lowered by means of an expansion spring 73 between the valve and the upper end of the casing 64, when the magnet is deenergized.

It is desirable to provide a dash pot to retard the downward movement of the valve 65 whereby the gate will be completely closed even though the magnet 72 is deenergized before the gate reaches its closed position. This dash pot includes a cylinder 74 and a piston 76 working therein and having an upwardly extending piston rod 75 connected to the valve 65. The cylinder 74 has a by-pass 77 containing a valve 78 to regulate the flow of fluid therethrough from one end of the cylinder to the other, whereby to control the movement of the piston 76 and valve 65. The piston 76 has a downwardly opening spring pressed check valve 91, as seen in Fig. 9, which permits the piston to move upwardly freely when the magnet 72 attracts the armature 71, but the valve 91 seats when the piston 76 moves downwardly, to thereby retard the downward movement of the parts. Thus, when the valve 65 is raised, so that pressure fluid flows into the cylinder 59 to move the gate 53 to closed position, the magnet 72 in being deenergized before the gate reaches its final closed position, will not result in the sudden downward movement of the valve 65 to cut off the pressure fluid, since the dash pot will prevent this and afford sufficient opportunity for the pressure fluid to completely close the gate.

The pipe 67 is supplied with compressed air or other pressure fluid from a tank 79 to which one end of said pipe is connected, and said tank is supplied with pressure fluid from a pipe 80 connected thereto and connected to a pump 81 operated by an electric motor 82 disposed in the electrical circuit 83. The pipe 80 has a check valve 84 which prevents the backward flow of air, and an armature switch 85 in the circuit 83 controls the operation of the motor by opening and closing the circuit. Said switch 85 is controlled by an electromagnet 86 disposed in a shunt 87 of the circuit, said shunt having a manually operable switch 87' which can be operated when necessary. A pressure gage 88 connected to the tank 79 has a pointer 89 which acts as a switch for controlling the flow of current through the shunt 87, a pair of arcuate contacts 90 being carried by the gage 88 along which the pointer or switch wipes, said pointer bridging the gap between the contacts below a predetermined pressure, and when said pressure is exceeded, the pointer will be removed from said contacts to open the shunt. When the shunt is closed, the magnet 86 is energized to close the switch 85, whereby the motor 82 is operated to operate the pump 81, and supply pressure fluid to the tank 79, it being assumed that the switch 87' is closed, and when the pressure has reached a predetermined number of pounds, the pointer 89 is removed from the contacts 90 to open the shunt, and thereby deenergize the electromagnet 86, so that the switch 85 is opened to stop the motor 82, thereby preventing excessive pressure.

Disposed at each floor is an outer controlling switch including a slab 92 to which a switch lever 93 is pivoted, as at 94, said lever having oppositely extending cams 95 with which a member 96 is engaged under the influence of a spring 97. The member 96 tends to move between the cams 95, whereby to turn the lever 93 to normal intermediate position after it has been swung in either direction. The member 96 is forced against the tension of the spring by either cam 95 when the lever 93 is swung, to assure the return of the lever 93 automatically to normal intermediate position, when the hand is removed therefrom. The slab 92 carries a pair of arcuate contacts 98 engaged by an insulated plate 98' carried by the switch lever 93, and carries a pair of opposite arcuate contacts 99 between which the switch lever is normally disposed, and the lever is engaged with one of said contacts 99 as soon as the lever is moved slightly in either direction. The slab 92 also carries a pair of contacts 100 at opposite sides remote from the lever 93 in normal position, the contacts being adapted to be engaged by said lever only after it is swung along the contacts 99. The plate 98' is removed from the contacts 98 when the switch lever is swung to engage either contact 100. The levers 93, in the outer controlling switches as illustrated, are moved to the left to call the car down to the respective floor, and are moved to the right to call the car upwardly to the floor at which the switch is operated, and the switches of the lowermost and uppermost floors are therefore provided with but a single contact 99 and a single contact 100 at the proper side, as seen in Fig. 1.

Each of the outer controlling switches is provided with means for preventing the switch lever 93 from being moved in engagement with either of the contacts 100 if any one of the other controlling switches has been operated, thereby preventing interference, and also preventing the loss of control of the car by the person first operating one of the floor or outer controlling switches. Thus, a stop 101 is slidable through the slab 92 in the path of movement of the lever 93, and when projected from the slab will prevent said lever from reaching either contact 100. An electromagnet 102 when energized attracts the stop 101 which carries an armature, and the stop 101 is retracted under the influence of a spring 104 when the electromagnet is deenergized, thus allowing the lever 93 to swing its full stroke in either direction. The electrical connections are such, as will hereinafter more fully appear, that when one lever 93 is moved in either direction, its engagement with the respective strips 99 will result in the energization of the magnets 102 of the other controlling switches, so that their switch levers 93 cannot be moved into engagement with the contacts 100, while the switch lever 93 first operated can move without interference to the desired contact 100. Should two such levers 93 be operated simultaneously, each one in engaging one contact 99 will prevent the other from reaching the contact 100, so that neither of the switches can be operated to get control of the car unless one of the levers 93 is returned to normal position.

A lock is provided for each of the gates 53, the details of one lock being illustrated in Figs. 12 and 13. The lock for each floor embodies a casing 105 secured to a suitable support and adapted to receive a bar 106 carried by the gate 53, said bar being moved into the casing 105 when the gate is closed. The bar 106 has a beveled lug 107 at its end. A solenoid or electromagnet 108 is mounted within the casing 105 and its core or armature 109 carries a catch 110 to snap into engagement with the lug 107 when the magnet 108 is deenergized, the catch 110 moving by spring tension behind the lug 107 when said lug is moved into the casing so as to raise the catch 110. When the magnet 108 is deenergized, the catch 110 will therefore hold the gate closed. The catch 110 carries a beveled lug 111 with which a secondary car-operated catch 112 is engageable, the catch 112 being moved toward the catch 110, by means of a spring 113, so that when the catch 110 is in projected position in engagement with the lug 107, as seen in Fig. 12, the catch 112 will move over the lug 111 to hold the catch 110 down, unless the catch 112 is retracted by means of a vertical cam member 114 carried by the car. Said member 114 has cams 115 at its ends to engage a pin 121 carried by the catch 112. As the car passes the various floors, the cams 115 in engaging the pins 121 will retract the catches 112. As illustrated in Fig. 12, the member 114 is in position with the car at the respective floor, with the catch 112 retracted, so as to allow the catch 110 to be raised if the magnet 108 is energized. A slidable stop 116 is mounted within the casing 105 at a point spaced from the catch 110 and is normally retracted from the path of the lug 107 by a spring 117. A lever 118 fulcrumed within the casing at 119, has one end pivoted to the stop 116 and has its other end pivoted to the catch 110, whereby when the magnet 108 is deenergized, the spring 117 comes into play for retracting the stop 116 and swinging the lever 118 to project the catch 110 for engagement with the lug 107. When the magnet 108 is energized, it retracts the catch 110 and swings the lever 118 to project the stop 116 against the tension of the spring 117, so that when the lug 107 is released by the catch 110, it is stopped after a short movement by the stop 116, to permit of but a small opening movement of the gate, until the stop 116 is retracted, when the gate can move open without further interference. The pin 121 projects through a horizontal slot 122 in that side of the casing 105 facing the elevator shaft, and the pivot 120 between the lever 118 and catch 110 extends through vertical slots 123 in the sides of the casing to provide a finger piece for retracting the catch 110 from within the car and the floor. Should a person enter the car and then change his mind without going to another floor, the gate can be opened after being closed, the catch 112 being in retracted position, by raising the pin 120 to retract the catch 110, thus releasing the bar 106, and then when the catch is released, the stop 116 is retracted to allow the lug 107 to pass and the gate to open, whereby the person can step out of the car. The finger piece 120 can be operated from the floor as well as the car for opening the gage when the car is at the floor, inasmuch as the catch 112 is then retracted, but the gate cannot be unlocked in the absence of the car.

A conductor 124 connected to the feed conductor 38 is connected to one terminal of each of the controlling electromagnets 72 of the gate operating means, and contacts 125 are connected to the other terminals of said magnets and cooperate with contacts 126, there being for each gate 53 a pair of contacts 125 and 126 so arranged that when the gate is in closed position, the circuit is opened between the contacts, but as soon as the gate is opened slightly, the same bridges the gap between the contacts to close the circuit. The contacts 126 are connected to a conductor 127 which is connected through the intervention of floor or outer gate closing switches 128 with a conductor 129 connected to the feed conductor 35. The detail construction of one floor or outer gate closing switch is illustrated in Fig. 22, the same embodying a pivoted switch 128 which when pressed by the finger engages and bridges a pair of contacts 128′ one of which is connected to the conductor 127 and the other to the conductor 129, and an electromagnet 128ᵃ is connected in series with said contacts between the conductors 127 and 129, whereby when the switch 128 is moved into engagement with the contacts to close the circuit, the magnet 128ᵃ is energized to hold the armature switch 128 in closed position until the circuit is opened at another point in which event the magnet 128ᵃ is deenergized and the switch 128 thrown open by spring tension. Supposing that the gate 53 of one floor is opened to enable a passenger to vacate the car, said gate is then closed by operating the respective switch 128 as the passenger leaves the car, so that current will flow from the conductor 35 along the conductor 129 then across to the conductor 127 by way of the switch 128 which has been closed, then to the contact 126, and opened gate 53 to the contact 125, then through the electromagnet 72 and along the conductor 124 to the conductor 38. The magnet 128ᵃ of the closed switch 128 will hold said switch in closed position, and the respective magnet 72 is energized whereby to raise the valve 65 so that pressure fluid flows into the respective cylinder 59 for advancing the piston 58 and moving the gate to closed position. Just before the gate reaches final closed position, it is removed from the contacts 125, and 126, thereby opening the circuit through the magnets 72 and 128ᵃ, so that the switch 128 opens, and the magnet 72 releases the valve 65, but due to the provision of the dash pot, the downward movement of the valve 65 is impeded sufficiently to let the pressure fluid completely close the gate after the gate is removed from the contacts 125 and 126.

The conductor 127 is also connected to a vertical rail 130 mounted in the elevator shaft whereby an opened gate can be closed after the car is occupied, as will hereinafter more fully appear.

Conductors 131, 132, 133, 134 and 135 are connected to the conductor 38, and each of said conductors has an individual winding upon each of the magnets 102 of the floor or outer controlling switches, excepting that the conductors 131, 132, 133, 134 and 135 do not have a winding on the respective magnets 102 of the first, second, third, fourth and fifth floors. Thus, when current flows through the conductor 131, all of the magnets 102 are energized, except that of the first floor, and when current flows through the conductor 132, all of the magnets 102 are energized except that of the second floor, and so on, as will be clearly evident by reference to Figure 1. The conductors 131, 132, 133, 134 and 135 are connected to the contacts 99 of the first, second, third, fourth and fifth floors, respectively. The switch levers 93 are all connected to a conductor 136 which is connected to a conductor 137 that is in turn connected to the feed conductor 35, the feed conductor 137 having pairs of contacts 138 disposed therein, which are normally bridged by insulated switch members 139 carried by the gates, so that when the gates are all closed, the circuit through the conductor 137 is closed, but should any one gate be opened, the circuit is opened between the respective contacts 138, so that no current can flow through the entire conductor 137. Thus, when any gate is opened, current can not flow from the conductor 35 to the conductor 136 and levers 93 of the floor or outer controlling switches. A branch conductor 140 is also connected to the conductor 137 and to a vertical rail 141 in the elevator shaft.

A conductor 142ᵃ connected to the conductor 38 has branch conductors 142′ provided with individual windings on the magnets 102 of the various floors and said conductors 142′ are connected to certain contacts 98 of the respective floors. The other contacts 98 are connected by a conductor 142 with a rail 143 in the elevator shaft, whereby current flowing through the conductor 142 and plates 98′ will energize those magnets 102 whose corresponding switch levers 93 are in intermediate position to prevent the movement of said switch levers 93 to the contacts 100. The rail 143 is connected by a conductor 144 with contacts 145, one for each gate 53, and contacts 146 cooperate with the contacts 145 and and are connected by conductors 147 with the conductor 137. The several sets of contacts 145 and 146 are arranged adjacent the corresponding sets of contacts 125 and 126, so that when the gates are closed, the circuits are opened between the contacts 145 and 146, on the one hand, and the contacts 125 and 126 on the other hand, but when one gate is opened, it bridges the gap between the adjacent pair of contacts 145 and 146 to close the circuit at this point. When any one gate is opened, it not only bridges the gap between the respective contacts 125 and 126, but it also bridges the gap between the respective contacts 145 and 146, so that even though the circuit of the conductor 137 is broken at this point, current can flow through said conductor 137 to the open gate, and then by way of the conductor 147 and contacts 145 and 146 to the conductor 144 and rail 143.

A conductor 148 connected to the conductor 144 is connected to one terminal of each of a series of lamps 149 disposed at the various floors, the other terminals of said lamps being connected to a conductor 150 connected to the conductor 38, so that it will be apparent that when one gate is opened, to supply current to the conductor 144, said current will flow through the lamps 149 and conductor 150 to the conductor 38, thereby lighting all the lamps, which will indicate at the various floors that one of the gates is open. Furthermore, when one gate is open, so as to supply current to the conductor 144 and rail 143, the current can flow through the conductor 142 and the respective windings of the magnets 102, so that the stops 101 of the outer controlling switches are projected to prevent the switch levers 93 from being moved to the contacts 100.

A set of conductors 155, 156, 157 and 158 are connected with the respective switches 17, 16, 15 and 14, and each has an individual winding on the electromagnet 40, and an individual winding on each of the magnets 102. The conductors 155, 156, 157 and 158 have individual windings upon the electromagnets 108 of the first, second, third and fourth floors, respectively, and are connected to the left-hand contacts 100 of the first, second, third and fourth floors respectively. Thus when the circuit through the conductor 155 is closed, the magnet 40, all of the magnets 102, and the magnet 108 of the first floor are energized. The magnets 40 and 102 are energized when current flows through any of the conductors 155, 156, 157 and 158, but only one of the magnets 108 is energized, according to the respective floor, the conductors 155, 156, 157 and 158 being for the first, second, third and fourth floors, respectively.

A set of conductors 159, 160, 161 and 162, for the second, third, fourth and fifth floors, respectively, are connected to the respective switches 25, 24, 23, and 22, and each has an individual winding on the magnet 42 and an individual windings on each of the magnets 102. The conductors 159, 160, 161 and 162 have individual windings upon the magnets 108 of the second, third, fourth and fifth floors, respectively, and are connected to the right-hand contacts 100 of the outer controlling switches of said floors respectively.

Conductors 163, 164, 165 and 166, are connected to the respective conductors 155, 156, 157 and 158, between the respective magnets 108 and contacts 100, and said conductors are connected to the respective vertical rails 167, 168, 169 and 170 in the elevator shaft. Conductors 171, 172, 173 and 174 are connected to the magnets 108 and contacts 100 of the four upper floors, and also to the respective vertical rails 175, 176, 177, and 178 in the elevator shaft.

Conductors 180, 181, 182 and 183 are connected with the respective switches 18, 19, 20 and 21 and to the respective vertical rails 184, 185, 186 and 187 in the elevator shaft. Conductors 188, 189, 190 and 191 are connected with the respective switches 29, 28, 27 and 26 with the respective vertical rails 192, 193, 194 and 195 in the elevator shaft. The contacts of the switches 14 to 29, inclusive, are all connected to a conductor 179 which is connected to the feed conductor 38.

A switch board 196 is carried by the car 197, and includes a suitable casing 198 carrying a series of tubular members 199, 200, 201, 202, 203, 204, 205, 206, 207, 207′, 208, 209, 210, 211, 212, 213, 214, 215, 216, 217, and 218. Within each of said tubular members is a slide 219 carrying a roller 220 bearing against the respective rails in the elevator shaft to provide a rolling collector, or contact, the member 219 being moved toward the rail by a spring 221 confined within the tubular member. The members 199 to 218, inclusive, including the member 207′, are in electrical connection with the respective rails 143, 187, 186, 185, 167, 168, 169, 170, 141, 175, 176, 177, 178, 192, 193, 194, 195, 152, 153 and 130. Instead of utilizing the rails and sliding contacts, however, the members 199 to 218, inclusive, can be connected by flexible conductors with the conductors leading from the rails in the elevator shaft as will be readily understood by those skilled in the art to which my invention pertains.

The switchboard 196 includes a set of car-carried or inner controlling switches 222, 223, 224 and 225 for the first, second, third and fourth floors, respectively, a set of switches 226, 227, 228 and 229 (also car carried or inner controlling switches) for the second, third, fourth and fifth floors, respectively; and a car carried or inner gate closing switch 230. The switches 222 to 225, inclusive, are for controlling the car in its downward movement, while the switches 226 to 229, inclusive, are for controlling the car in its upward movement. Said switches are each pivoted within the casing 198, as at 231.

An electromagnet 232 is provided for each of the switches 222 to 230, inclusive, whereby to attract and hold the respective armature switches.

The magnet 232 of switch 230 is interposed in a conductor 233 connected to the member 218 at one end and with a contact 234 at the other end with which the switch 230 is engageable to connect the members 217 and 218 electrically when the switch 230 is pressed to closed position. When said switch is closed, the circuit is closed through the magnet 232 to hold said magnet energized and the switch closed until the circuit is opened at another point, each of the switches of the switch board 196 being spring pressed so as to fly open when the respective magnet is deenergized.

Each of the switches 222 to 229, inclusive, carries opposite insulated plates 235 and 236 engageable with the respective pairs of contacts 237 and 238 within the casing 198. Thus, each plate 235, when the respective switch is closed, is engageable with the respective pair of contacts 237, and the companion plate 236 is simultaneously engageable with the respective pair of contacts 238. The members 204, 205, 206, 207, 208, 209, 210 and 211 form contacts with which the respective switch levers 222 to 229, inclusive, are engageable, but the plates 235 and 236 are engageable with their contacts 237 and 238, respectively, before the switches engage their contacts, so that the circuits closed by the plates 235 and 236 are closed before the circuits closed by the switches themselves are closed, the contacts 237 and 238 projecting beyond the contacts 204 to 211, inclusive. One contact 238 of each pair is connected with a conductor 239 which is connected to the member 216 and the rail 152. Conductors 240 are connected to the other contacts 238 of the up switches 226, 227, 228 and 229 and have individual windings upon the respective magnets 232, said conductors 240 being connected to a bar 241 in the casing 198. Conductors 242 are connected to the other contacts 238 of the down switches 222, 223, 224 and 225 and have individual windings upon the respective magnet 232 and are connected with a second bar 243 in the casing. Another bar 244 in the casing is connected by conductors 248 with the switches 222, 223, 224 and 225, and a fourth bar 246 in the casing is connected by conductors 247 with the switches 226, 227, 228 and 229. Conductors 248 are connected to the bar 244 and each has an individual winding upon the magnets 232 of the switches 222, 223, 224 and 225, and said conductors 248 are connected to one contact 237 of each pair for said switches. The bar 246 has conductors 249 connected thereto which are provided with individual windings upon the respective magnets 232 of the switches 226, 227, 228 and 229, and said conductors 249 are connected to certain contacts 237 of the pairs for said switches. The other contacts 237 of the switches 225, 224, 223 and 222 are connected by the respective conductors 250, 251, 252 and 253 with the members 203, 202, 201 and 200. The other contacts 237 of the switches 226, 227, 228 and 229 are connected by the respective conductors 254, 255, 256 and 257 with the members 212, 213, 214 and 215.

Means are provided whereby when one or more switches of either set 222—225 or 226—229 are pressed to closed position, for preventing any of the switches of the other set being closed, whereby to prevent switches being closed for directing the car both upwardly and downwardly, although any number of switches of either set can be closed for stopping the car at the various floors during its course in either direction. Thus, plates or members 258 and 259 are slidably mounted within the casing 198, behind the free ends of the respective switches 222—225 and 226—229, as seen in Figure 18, said members being spring pressed to normally move the notches 260 thereof into position to receive the switches, whereby said switches can be closed without interference. The members 258 and 259 are controlled by electromagnets 261 and 262 respectively which attract armatures 263 carried by said members. When either of the members 258—259 is moved by its armature being attracted by the respective electromagnet, the notices of said member are moved out of alinement with the respective set of switches, so that none of said switches can be closed. A conductor 264 is connected with the member 199 and has an individual winding on the electromagnet 262, and is connected to the bar 243. A conductor 265 is also connected to the member 199 and has an individual winding on the magnet 261 and is connected to the bar 241. A conductor 266 is connected with the bar 244 and has an individual winding on the magnet 262, and is connected to a conductor 267 which is in turn connected to the member 207'. A second conductor 268 is connected to the conductor 267 and is connected to the bar 246, said conductor 268 having an individual winding on the magnet 261.

In order to prevent the loss of control of the car after a person enters the car and closes the gate, there is disposed above the floor 269 of the car, as illustrated in Figures 19 and 20, a false floor 270 normally raised by a spring 271 and carrying a switch member 272 which is normally raised from a pair of contacts 273, so that when a person occupies the car, the false floor 270 is depressed to cause the switch member 272 to bridge the contacts 273 for closing the respective circuit of this point. One of the contacts 273 is connected by a conductor 274 with the member 207', and the other contact is connected by a conductor 275 with the member 216.

The operation of the apparatus is as follows:—Supposing that the car is at the first floor, and that two persons are on the fourth floor, one of them desiring to go to the third floor, and the other to the first floor, the switch lever 93 at the fourth floor is swung to the right, to call the car upwardly to the fourth floor. The instant the switch lever 93 engages the right hand contact 99, a circuit is closed including the conductor 35, conductor 137, conductor 136, switch lever 93 of the fourth floor controlling switch, the right hand contact 99 of said switch, conductor 134 including a winding of each of the magnets 102 with the exception of the magnet 102 of the fourth floor, and the conductor 38. As a result, the magnets 102 of all of the floors except the fourth floor are energized, so as to project the stops 101 of the first, second, third and fifth floors, thereby preventing the movement of any of the other switch levers 93 to the contacts 100. The stop 101 of the fourth floor controlling switch, however, remains in retracted position since the respective magnet 102 is not energized, but should two of the switch levers 93 at different floors be operated simultaneously, both of them will be prevented from moving to the contacts 100, as above pointed out. Now, when the switch lever 93 of the fourth floor is moved further to engage the right hand contact 100, a circuit is closed which circuit includes the conductor 35, conductor 137, conductor 136, switch lever 93 of the fourth floor controlling switch, contact 100, conductor 161, electromagnet 108 of the fourth floor, conductor 161, all of the electromagnets 102, electromagnet 42, switch 23 which is in closed position, conductor 179 and conductor 38. As a result of the above circuit being closed the electromagnet 42 is energized and the switch 41 is closed whereupon current flows from the conductor 35 through the conductor 37 back to the conductor 38 thereby energizing the magnet 52 to release the motor brake, not shown, whereupon the motor is operated to bring the car to the fourth floor. After the switch lever 93 is moved into engagement with the contact 100, all of the magnets 102 are now energized, and the magnet 108 of the fourth floor being energized will tend to raise the catch 110 of the fourth floor gate lock, but this is ordinarily prevented by the catch 112, the circuit of the magnet 108 remaining closed until the car reaches the fourth floor. When the car reaches the fourth floor, the switch 23 is opened, thereby breaking the circuit including the conductor 161, and the magnet 42 being deenergized, the switch 41 will open. Upon opening the switch 41, the motor circuit, including conductors 37 and 38, is opened to stop the motor and apply the brake, not shown. Just before the switch 23 is opened, the cam member 114 moves into engagement with the pin 121 so as to retract the catch 112 away from the lug 111, and the magnet 108 being energized will raise the catch 110 and release the lug 107 so that it moves against the stop 116 which is projected when the catch 110 is retracted. Then, when the switch 23 is opened, the magnet 108 in being deenergized, releases the catch 110, and the spring 117 retracts the stop 116, whereby to let the gate move without further interference, the gate being moved open by the spring 60, since the valve 65 is normally lowered to permit the fluid within the cylinder 59 to be forced to the atmosphere as the piston 58 is moved by the spring. The car being now stopped at the fourth floor and the gate unlocked and moved to open position permits the car to be occupied. It is to be noted that after the switch lever 93 was moved into engagement with the contact 100, the magnet 102 of the fourth floor was energized the same as the other magnets due to the flow of current through the conductor 161, thereby locking the switch lever 93 of the fourth floor in engagement with the contact 100 due to the projection of the stop 101 of the fourth floor controlling switch, but when the car reaches the fourth floor, so as to open the circuit of the conductor 161 at switch 23, the magnet 102 of the fourth floor in said circuit being deenergized permitted the respective stop 101 to be retracted, thereby releasing the switch lever 93 which is returned automatically to normal position by spring tension. The gate of the fourth floor upon being partially opened by the engagement of the cam 115 with the pin 121 before the switch 23 is opened, moves into engagement with and electrically connects the contacts 145 and 146 before the circuit of the conductor 137 is opened, so that current now flows by way of another circuit hereinafter pointed out to all of the magnets 102 except the one at the fourth floor, thereby further preventing the control of the car being taken from the person or persons about to occupy the same at the fourth floor. The cam 115 engages the pin 121 before the holding circuit (which holds the fourth floor magnet 102 energized) is opened, therefore permitting the gate to start to open. When the gate of the fourth floor is partially opened by the cam 115 engaging the pin 121, a circuit is closed before the switch 23 is opened including the conductor 35, conductor 137 to the fourth floor gate, respective conductor 147, contacts 145—146 of the fourth floor gate 53, conductor 144, rail 143, conductor 142, contacts 98 and plates 98' of the switch levers 93 of all of the floors except the fourth floor, conductors 142' and windings of magnets 102 of all floors except the fourth floor, conductor 142$^a$ and conductor 38. It will be noted that while the switch lever 93 of the fourth floor which was previously moved to bring the car to the floor is held by the stop or detent 100, a gap between the contacts 98 of the fourth floor controlling switch is maintained at which time the magnet 102 of the fourth floor depends for its de-energization upon the closed circuit through the switch 23 and conductor 161. When the switch 23 is open the magnet 102 at the fourth floor is de-energized a sufficient length of time to unlock the fourth floor lever 93. The instant the lever 93 at the fourth floor is released the gap between the contacts 98 is closed and the stop 100 is projected by reason of the flow of current from the conductor 142 through the conductor 142' to the conductor 142ᵃ as previously described in connection with the remaining floors.

As above indicated, it will be noted that the cam member 114 engages the pin 121 before the car reaches the selected floor and before the holding circuit of the corresponding floor switch is opened. Thus, the gate is permitted to start open before said holding circuit is opened. Between the time that the cam 115 engages the pin 121 and the time that the holding circuit of the corresponding floor switch is opened, a circuit, including conductor 137, conductors 147, contacts 145 and 146, conductor 144, rail 143, conductor 142, conductor 142ᵃ and certain plates 98′, contacts 98, and conductors 142′, is closed by the partially opened gate to maintain the magnets 102 of the other floor switches energized. When the holding circuit referred to is opened, the magnet 102 of the floor switch at the floor where the gate is opened is simultaneously deenergized. The corresponding switch lever 93 is therefore returned to neutral position, while the other switch levers 93 cannot be moved to car controlling position. When the switch lever 93 is returned to neutral position, this will immediately close the circuit between the contacts 98, thereby also energizing the magnet 102 of the floor whose gate is open. It will be seen, therefore, that when the car is called to any floor, the respective magnet 102 is first deenergized and later energized while the magnets 102 of the other floors are maintained in energized condition by the opening of the gate. The control of the car can not therefore be taken away from the persons on the fourth floor after the car has been called. The gate closing switch 230 of the car is then pressed to closed position and will close the circuit including conductor 35, conductor 154, rail 153, member 217, switch 230, contact 234, conductor 233 including the magnet 232, member 218, rail 130, conductor 127, contacts 125—126 and gate 53 of the fourth floor, which gate is opened, the magnet 72 of the fourth floor, conductor 124 and conductor 38. The magnet 232 being energized will hold the switch 230 in closed position until the circuit is opened by the closing of the gate, and the magnet 72 of the fourth floor gate being energized will raise the valve 65 so that pressure fluid will flow into the cylinder 50 to advance the piston 58 against the tension of the spring 60 and thereby move the gate of the fourth floor to closed position When the gate is closed, it is removed from the contacts 125—126 thereby opening the circuit, so that the magnet 232 is de-energized to release the switch 230, which will fly open. Now that the gate is closed, the loss of the control of the car by the operation of one of the outer controlling switches before the occupant has operated one of the up or down switches of the switchboard 196, is prevented by the circuit, closed by the switch member 272, including the conductor 35, conductor 137, conductor 140, rail 141, member 207′, conductor 274, contacts 273 and switch member 272, conductor 275, member 216, rail 152, conductor 151 including an individual winding of each of the magnets 102, and conductor 38. Therefore, when the car is occupied, all of the magnets 102 are energized whereby to project the stops 101 of the outer controlling switches to prevent the switch levers 93 from being moved into engagement with the contacts 100 thus preventing the outer controlling switches from being operated sufficiently to obtain control of the car. The persons in the car desiring to go to the third and first floors will press the switches 222 and 224 for the first and third floors going down, respectively. These switches can be pressed to closed position before the switch 230 is operated for closing the gate. Supposing that either one of the switches 222 or 224 is operated before the switch 230 with the gate of the fourth floor open, then a circuit is closed including the conductor 35, conductor 137 to the contacts 138 of the fifth floor gate, the respective conductor 147 of the fourth floor gate, contacts 145—146 of the fourth floor gate, conductor 144 (a portion of the current flowing through the shunt including the conductor 148, lamps 149 and conductor 150 to light said lamps), rail 143, member 199 of the car switch-board, conductor 264 including a winding of electromagnet 262, bar 243, thence through the electro-magnet or electro-magnets 232 of said down switches to conductor 239, member 216, rail 152, conductor 151 including a winding of each magnet 102, and conductor 38. Magnet 262 being energized will operate the member 259 whereby to prevent the closing of any of the up switches 226, 227, 228 and 229. The switches or switch of the set 222—225 which have been operated will be held in closed positions by the energization of the respective magnets 232 thereof, even when the gate is open. If the switches 222 and 224 are closed after the gate is closed, then the circuit just described will not be closed, due to the closing of the gate and the opening of the circuit between the contacts 145 and 146 of the fourth floor. The bars 241 and 243 will therefore not receive current when the gate is closed, but if the switches 222 and 224 are closed before the gate is closed, then they will not fly open due to the closing of the gate, because other circuits through the holding magnets 232 are closed, upon closing the gate, to prevent the deenergization thereof, these circuits being the same as when the said switches 222 and 224 are closed after the gate 53 is closed. The circuit brought into operation upon closing the switch 222 after closing the gate 53 includes the conductor 35, conductor 137, conductor 140, rail 141, member 207′, conductor 267, conductor 266 including the winding of electro-magnet 262, bar 244 which is charged with positive current, conductor 248 and magnet 232 of switch 222, contacts 237 and plate 235 of said switch, conductor 253 member 200, rail 187, conductor 183, switch 21 which is now closed and which is opened when the car reaches the first floor, conductor 179 and conductor 38. The circuit brought into operation upon closing the switch 224 includes the same connections between the conductor 35 and bar 244, and from said bar on includes the conductor 248 and magnet 232 of switch 224, contacts 237 and plate 235 of said switch, conductor 251, member 202, rail 185, conductor 181, switch 19 which is now closed but opened when the car reaches the third floor, conductor 179 and conductor 38. Therefore, as soon as the fourth floor gate is closed to open the circuit including the bars 241 and 243, the bars 244 and 246 are connected in their circuits due to the closing of the gate and the re-establishment of the flow of current through the conductor 137. The magnets 232 which were energized by the operation of the switches 222 and 224 before the switch 230 was operated, if this was the case, will be maintained energized, to prevent the releasing of the switches 222 and 224. The contacts 237 and 236 project beyond the contact members 204, 205, 206, 207, 208, 209, 210 and 211, whereby when any of the respective up or down switches is closed, the plates 235 and 236 will first engage the contacts 237 and 238 before the switches engage their main contact members 204—211. This assures of the energization of the magnet 261 or magnet 262 before the main circuits are closed, whereby when any one of the switches 222, 223, 224, and 225 is operated, the magnet 262 will be energized before said switches engage their contact members, and if any one of the switches 226, 227, and 229 is operated, magnet 261 will be energized before said switches engage their contact members. This assures the locking of the switches of one set when one or more switches of the other set are operated and if a switch of each set is operated at the same time, both sets of switches will be locked against complete closing movement against their contact members. The switches 222 and 224 being held in closed position by their holding magnets 232, will close two main circuits. One of these circuits includes the connections between the conductor 35 and bar 244 as above described, respective conductor 245, switch 222, contact members 204, rail 167, conductor 163, first floor magnet 108, conductor 155 including windings of magnets 102 and magnet 40, switch 17 which is now closed and which opens when the car reaches the first floor, conductor 179 and conductor 38. The other circuit includes the connections between the conductor 35 and bar 244, respective conductor 245, switch 224, contact member 206, rail 169, conductor 165, third floor magnet 108, conductor 157 including windings of magnets 102 and 40, switch 15 which is now closed and which opens when the car reaches the third floor, conductor 179 and conductor 38. Magnets 102 are thus energized to prevent the switch levers 98 being moved to the contacts 100, and magnet 40 is energized to close the switch 39 whereby current will flow through the motor 1 from the conductor 36 to the conductor 38. The motor is therefore operated in the proper direction to lower the car, it being kept in mind that the magnets 108 of the third and first floors are energized during the downward movement of the car. Just before the car reaches the third floor, its cam member 114 in retracting the catch 112 will release the catch 110 so that it is raised by the energization of the magnets 108, thereby releasing the bar 106 so that the gate opens slightly until the lug 107 strikes the stop 116. Switches 15 and 19 are opened when the car reaches the third floor. Switch 15 being opened opens the circuit including conductor 157 and third floor magnet 108, and said magnet 108 being deenergized will release the catch 110 so that the stop 116 is retracted by its spring 117, thereby permitting the gate to be opened under the influence of the gate opening spring 60. Switch 19 being opened opens the circuit of the magnet 232 of switch 224, so that said switch is released and will fly open. The third floor gate being opened will interrupt the flow of current through the conductor 137 to the bars 244 and 246, so that current cannot flow from the bar 244 through the switch 222 and respective conductor 248 and its windings on the magnet 232. Switch 222 will not fly open, however, since the third floor gate being opened will close the circuit between the respective contacts 145 and 146, so that the rail 143 is again charged with positive current, and the circuit to the conductor 38 is completed by the conductor 264 including the winding of the magnet 262 to maintain it energized, bar 243, conductor 242 and magnet 232 of switch 222, contacts 238 and plate 236 of said switch, conductor 239, member 216, rail 152 and conductor 151 including the magnets 102. The gate is opened automatically, and enables the person who intended to go to the third floor to step out of the car. The gate is then closed either by operating the switch 230 from within the car or by operating the outside gate closing switch 128, and the moment that the gate is closed, bar 243 is no longer energized, but the bar 244 is energized, to maintain the magnet 232 of switch 222 energized, and current will again flow through the circuit including the switch 222 and switch 17, as before. Magnet 40 being energized, the car will again move downwardly, passing the second floor, and just before the car reaches the first floor, the cam member 114 in moving the catch 112 to releasing position will result in the catch 110 being released, resulting in the partially opening of the first floor gate in substantially the same manner as the third floor gate was partially opened, and the car will be stopped at the first floor in the same manner, the switch 222 and 39 being opened due to the opening of the switches 17 and 21, respectively. Upon opening the switch 222, the magnet 108 of the first floor becomes de-energized, whereupon the gate is completely opened by the spring 60. When the passenger leaves the car, the gate closing switch 128 of the first floor is closed whereby to close the gate.

From the foregoing description, taken in connection with the drawings, it should be evident that when any one of the outer controlling switches is operated properly, the proper circuit is closed for bringing the car to the floor, the gate being opened automatically. It should also be manifest that one or more switches of either set of the switch-board 196 can be operated so that the car will stop at the selected floor or predetermined selected floors in succession. When the switches of the switch-board 196 are operated, this results in the proper magnets 108 being energized, as well as magnet 40 or 42, to move the car in the proper direction either upward or downward, according to the set of switches of the switch-board 196 which are operated. The switches 14, 15, 16 and 17 serve to open the respective circuits as the car moves downwardly, whereby to stop the cars at the selected floors and automatically open the gates. The switches 22, 23, 24 and 25 perform the same functions as the switches 14, 15, 16 and 17 for the car going up, instead of down. Switches 18, 19, 20 and 21 are for the purpose of maintaining those switches of the set 222—225, whose floors the car has not yet reached in its downward course, in closed position, until the car reaches the selected floors. The switches 26, 27, 28 and 29 perform the same functions as the switches 18, 19, 20 and 21 but for the upward movement of the car, rather than the downward movement. The switches 26, 27, 28 and 29 hold the respective switches 226, 227, 228, and 229 in closed position before the car reaches the selected floors going up. Should a person fail to operate the respective switch 128 when leaving the car, the gate can be closed by operating the switch 128 at any floor, since all of said switches are connected in parallel.

What is claimed is:

1. In combination, a series of elevator doors at landings served by an elevator; a cylinder at each such landing; a piston within the cylinder; an operating connection between said piston and the door at each such landing; piston actuating means comprising a source of fluid pressure, means for connecting said source of fluid pressure with said cylinder whereby said piston is moved from one end of its travel to the other, and a spring opposing such movement and capable of returning said piston upon relief of the fluid pressure; said piston actuating means being normally ineffective to move said piston from the end of its travel corresponding to door-closed position; and means for rendering said piston actuating means operable upon the arrival of the elevator at any selected one of such landings to move the piston to door-open position.

2. In combination, a series of elevator doors at landings served by an elevator; a cylinder at each such landing; a piston within the cylinder; an operating connection between said piston and the door at each such landing; piston actuating means comprising a source of fluid pressure, means for connecting said source of fluid pressure with said cylinder whereby said piston is moved from one end of its travel to the other, and a spring opposing such movement and capable of returning said piston upon relief of fluid pressure; said spring being normally ineffective to move said piston from the end of its travel corresponding to door-closed position; and means for rendering said spring operable upon the arrival of the elevator at any selected one of such landings to move the piston to door-open position.

3. In an elevator door actuating mechanism; a cylinder; a piston within the cylinder; an operating connection between said piston and the door to be operated; piston actuating means comprising a fluid pressure connection to said cylinder for admitting pressure fluid thereto to move said piston from one end of its travel to the other, and spring means for returning said piston; and means for causing the operation of said piston actuating means upon the arrival of the elevator at a selected landing, comprising a member normally restraining said door from movement away from closed position and means for moving said member out of restraining position with respect to said door.

4. In an elevator door actuating mechanism; a cylinder; a piston within the cylinder; an operating connection between said piston and the door to be operated; piston actuating means comprising a fluid pressure connection to said cylinder for admitting pressure fluid thereto to move said piston from one end of its travel to the other, and spring means for returning said piston; a catch normally preventing movement of said door by said piston actuating means; and means operable to permit the withdrawal of said catch upon the arrival of the elevator at a selected landing.

5. In an elevator door actuating mechanism; a cylinder; a piston within the cylinder; an operating connection between said piston and the door to be operated; piston actuating means comprising a fluid pressure connection to said cylinder for admitting pressure fluid thereto to move said piston from one end of its travel to the other, and spring means for returning said piston; an electro-magnetically controlled catch normally preventing movement of said door by said piston actuating means; and means operable to permit the withdrawal of said catch upon the arrival of the elevator at a selected landing.

6. In an elevator door actuating mechanism; a cylinder; a piston within said cylinder; piston actuating means comprising fluid pressure means and spring means for moving said piston in opposite directions within said cylinder to obtain alternate opening and closing of said door; means for rendering one of said means operable to open said door upon the approach of the car to a selected landing; and subsequently operable means for rendering the other of said means effective to close said door as a condition precedent to the departure of the car from said selected landing.

7. In an elevator door actuating mechanism; power door operating means for moving the door at a selected landing in one direction, spring impelled door operating means at said landing for moving said door in the opposite direction, each of said door operating means being normally ineffective to move said door; means for rendering one of said door operating means operable to open said door upon the approach of the car to said selected landing; and subsequently operable means for rendering the other of said door operating means effective to close said door as a condition precedent to the departure of the car from said selected landing.

8. In an elevator door actuating mechanism, power door operating means for moving the door at a selected landing in one direction, spring impelled door operating means at said landing for moving said door in the opposite direction, a catch normally preventing movement of said door by one of said door operating means, and means for withdrawing said catch comprising an electromagnetically controlled device operable as an incident to the stopping of the elevator at said selected landing.

9. In a door actuating mechanism for use in an elevator having means operable successively to cause its stopping at and departing from a plurality of landings in succession: power means for moving the door at one of said landings in one direction; a spring at said landing in which energy is stored during such movement of the door, which energy when released is capable of moving the door in the opposite direction; and means for releasing the energy thus stored in said spring, said releasing means operating as an incident to the operation of said successively operable means.

10. In an elevator door actuating mechanism; a cylinder; a piston within the cylinder; an operating connection between said piston and the door to be operated; a source of fluid pressure having a connection from said source to said cylinder; a valve in said connection; means normally maintaining said valve in a position closing said connection; an outlet from said cylinder to the atmosphere, said outlet being normally open through said valve; and means for so moving said valve as to establish communication between said source of fluid pressure and said cylinder and simultaneously close said passage from said cylinder to the atmosphere; and yieldable means tending to retard movement of said piston in an opposite direction.

11. In an elevator door actuating mechanism; a cylinder having a normally open exhaust passage; a piston within said cylinder; an operating connection between said piston and the door to be operated; a source of fluid pressure having a normally closed inlet passage leading therefrom into said cylinder; a valve normally positioned to maintain said inlet passage closed and said exhaust passage open; means for so moving said valve as to close said exhaust passage and open said inlet passage to admit fluid pressure to said cylinder causing said piston to move in one direction; means for returning said valve to its normal position; and means for retarding the movement of said valve to its normal position.

12. In an elevator door actuating mechanism; a cylinder having a normally open exhaust passage; a piston within said cylinder; an operating connection between said piston and the door to be operated; a source of fluid pressure having a normally closed inlet passage leading therefrom into said cylinder; a valve normally positioned to maintain said inlet passage closed and said exhaust passage open; means for so moving said valve as to close said exhaust passage and open said inlet passage to admit fluid pressure to said cylinder causing said piston to move in one direction; means for returning said valve to its normal position; means for retarding the movement of said valve to its normal position; and means for varying the degree of retardation produced by said retarding means.

13. In an elevator door actuating mechanism; a cylinder having a normally open exhaust passage; a piston within said cylinder; an operating connection between said piston and the door to be operated; a source of fluid pressure having a normally closed inlet passage leading therefrom into said cylinder; a valve normally positioned to maintain said inlet passage closed and said exhaust passage open; means for so moving said valve as to close said exhaust passage and open said inlet passage to admit fluid pressure to said cylinder causing said piston to move in one direction; means for returning said valve to its normal position; and means rendered operable upon the approach of the elevator to a selected floor for moving the piston in an opposite direction.

14. In an elevator door actuating mechanism; a cylinder; a piston within the cylinder; an operating connection between said piston and the door to be operated; means for moving said piston in a direction to close the door comprising a source of fluid pressure and a valve for controlling the admission of fluid pressure to said cylinder from said source; means for returning said piston to a position corresponding to the open position of said door; a locking device normally preventing such return; and means for withdrawing said locking device upon the arrival of the elevator at a selected landing.

15. In a door actuating mechanism for use with an elevator serving a plurality of landings provided with a corresponding number of doors, a plurality of spring actuated operating members, each having an operative connection with its respective door, electrically controlled means for selectively rendering said members effective to move their respective doors in one direction, and power operated mechanism operable for selectively moving said doors in an opposite direction and for placing the springs of the respective spring actuated operating members in condition to effect movement of their respective doors in said one direction.

16. In combination, a series of elevator doors at landings served by an elevator, a plurality of spring actuated operating members for said doors, each having an operative connection with its respective door, control means for selectively rendering said members effective to move their respective doors in one direction, power operated mechanism operable for selectively moving said doors in an opposite direction and for placing the springs of the respective spring actuated operating members in condition to effect movement of their respective doors in said one direction, restraining means normally rendering said power operated mechanism and spring actuated members ineffective to move said doors, and means operable to permit the withdrawal of said restraining means upon the arrival of the elevator at the respective landings.

17. In an elevator door actuating mechanism; in combination with a door at a selected landing served by the elevator; a piston at said landing; an operating connection between said piston and said door; piston actuating means comprising, in part, a spring for moving said piston in one direction to cause corresponding movement of said door; an electro-magnetically controlled catch normally preventing movement of said door by said piston-actuating means; and means operable to permit the withdrawal of said catch upon the arrival of the elevator at said selected landing.

18. In an elevator door actuating mechanism, power door operating means for opening the door at a given landing, means normally preventing opening movement of said door by said power door operating means in the absence of the car from said landing, and means acting upon said preventing means to permit movement of the door by said power door operating means, said last named means operating as an incident to the stopping of the car at said given landing.

19. In a door actuating mechanism for use in an elevator having means operable successively to cause its stopping at and departing from a plurality of landings in succession; power means for moving the door at each such landing to open position; means normally preventing opening movement of said door by said power means in the absence of the car from such landing; means for initiating the operation of said power means; and means for causing said initiating means to act upon said preventing means to permit movement of the door by said power means, said last named means operating as an incident to the operation of said successively operable means.

20. In an elevator door actuating mechanism, power door operating means for moving the door at a given landing to open position, restraining means normally preventing movement of said door by said door operating means, and electrically controlled means for withdrawing said restraining means to permit operation of the door by said door operating means, said withdrawing means operating only in the event of the stopping of the elevator at said given landing.

In testimony whereof, I have affixed my signature to this specification.

WILLIAM C. MILES.